(12) United States Patent
Salvini (10) Patent No.: US 9,090,282 B2
(45) Date of Patent: Jul. 28, 2015

(54) STEERING DEVICE FOR A VEHICLE

(71) Applicant: CNH America LLC, New Holland, PA (US)

(72) Inventor: Tiziano Salvini, Tribiano (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/873,781

(22) Filed: Apr. 30, 2013

(65) Prior Publication Data

US 2013/0298716 A1    Nov. 14, 2013

(51) Int. Cl.
*B62D 1/16*    (2006.01)
*B62D 1/10*    (2006.01)
*B62D 1/06*    (2006.01)
*B60H 1/00*    (2006.01)

(52) U.S. Cl.
CPC ............ *B62D 1/105* (2013.01); *B60H 1/00292* (2013.01); *B62D 1/065* (2013.01); *B62D 1/16* (2013.01)

(58) Field of Classification Search
CPC ........ B62D 1/105; B62D 1/16; B60H 1/3407; B60H 1/247
USPC .................. 74/492, 493, 494, 496, 498, 552; 454/152; 237/12.3 A, 123 A
See application file for complete search history.

(56) References Cited

U.S. PATENT DOCUMENTS

| | | | | |
|---|---|---|---|---|
| 4,562,957 A * | 1/1986 | Nakagawa et al. | ...... | 237/12.3 R |
| 4,608,550 A * | 8/1986 | Umebayashi et al. | ....... | 307/10.1 |
| 5,152,358 A * | 10/1992 | Kozuka | ........................... | 180/78 |
| 5,946,977 A * | 9/1999 | Sato et al. | ........................ | 74/492 |
| 6,145,402 A * | 11/2000 | Nishitani et al. | ............ | 74/484 R |
| 6,189,919 B1 * | 2/2001 | Sinnhuber et al. | ............ | 280/731 |
| 6,533,184 B1 * | 3/2003 | Kim | ......................... | 237/12.3 R |
| 7,380,828 B2 * | 6/2008 | Menjak et al. | ................ | 280/779 |
| 7,614,682 B1 * | 11/2009 | Major et al. | .................. | 296/154 |
| 7,931,296 B2 * | 4/2011 | Choi | ............................. | 280/731 |
| 2002/0059848 A1 * | 5/2002 | Adomeit | ........................ | 74/498 |
| 2006/0121843 A1 * | 6/2006 | Koval | ............................ | 454/152 |
| 2007/0101728 A1 * | 5/2007 | Ruetz | .............................. | 62/3.61 |
| 2007/0137377 A1 * | 6/2007 | Kamei | ............................ | 74/493 |
| 2007/0186717 A1 * | 8/2007 | Chapelain et al. | .............. | 74/552 |
| 2007/0194562 A1 * | 8/2007 | Chapelain et al. | ............. | 280/731 |
| 2008/0314189 A1 * | 12/2008 | Lutz | ............................... | 74/492 |
| 2008/0315564 A1 * | 12/2008 | Muller | ....................... | 280/728.2 |
| 2009/0108617 A1 * | 4/2009 | Songwe, Jr. | .................... | 296/70 |
| 2013/0298716 A1 * | 11/2013 | Salvini | ........................... | 74/492 |

FOREIGN PATENT DOCUMENTS

| | | | |
|---|---|---|---|
| DE | 2164976 | 7/1973 | |
| DE | 2322484 | 11/1974 | |
| DE | 2823528 | 12/1979 | |
| DE | 19708092 | 9/1998 | |
| DE | 19708092 A1 * | 9/1998 | .............. B62D 1/04 |
| DE | 19953467 | 5/2001 | |
| FR | 2922178 | 4/2009 | |
| FR | 2949413 | 3/2011 | |

* cited by examiner

*Primary Examiner* — Karen Beck
(74) *Attorney, Agent, or Firm* — Sue C. Watson (57) ABSTRACT

A steering device for a vehicle comprises a steering wheel including a central part arranged for facing a driver and a rim that can be rotated in order to steer the vehicle, the steering wheel further comprising air dispensing means for directing an air flow towards the driver.

10 Claims, 6 Drawing Sheets

STEERING DEVICE FOR A VEHICLE

CROSS REFERENCE TO RELATED APPLICATIONS

This application claims priority to Italian Patent Application Serial No. MO2012A000125, entitled, "A steering device for a vehicle," filed May 11, 2012, which is incorporated by reference herein in its entirety for all purposes.

TECHNICAL FIELD

The invention relates to a steering device to be used in a vehicle. The steering device according to the invention can be used in a work vehicle such as a tractor, a combine or an operator machine. Alternatively, the steering device according to the invention can be used in a vehicle such as a car, a truck, a bus or the like.

BACKGROUND

Known tractors comprise one or more vents for directing warm air or cool air towards the driver, so that a proper temperature can be achieved inside the cab of the tractor. The vents are connected to an air distribution system through a series of conduits, which convey to the vents air at the desired temperature.

The vents are usually arranged on the dashboard behind the steering wheel.

A drawback of vents located behind the steering wheel is that the steering wheel constitutes an obstacle for air directed from the vents towards the driver. Therefore, air coming from the vents cannot reach directly the face of the driver. This can be uncomfortable especially during summer, when it is desirable to have a flow of cool air directly on the face of the driver.

Air coming from the vents located behind the steering wheel hits directly the hands of the driver while he or she is driving. The result is that, during summer, the fingers of the driver are cold, whereas his or her face is still hot. The opposite occurs during winter.

An object of the invention is to improve existing vehicles, particularly work vehicles such as tractors, combines or the like, but also standard vehicles such as cars.

Another object is to improve comfort for the driver of a vehicle, particularly as far as temperature inside the vehicle is concerned.

Another object is to ensure that air supplied by an air distribution system of a vehicle efficiently warms or cools the driver.

According to the invention, there is provided a steering device for a vehicle, comprising a steering wheel including a central part arranged for facing a driver and a rim that can be rotated in order to steer the vehicle, characterized in that the steering wheel further comprises air dispensing means for directing a flow of air towards the driver.

Owing to the air dispensing means, warm or cool air directed towards the driver can be supplied directly from the steering wheel. Hence, the steering wheel does not anymore constitute an obstacle for the flow of air coming from an air distribution system of the vehicle.

Furthermore, there is no risk that the hands of the driver are excessively cooled or heated, due to vents provided on the dashboard at a very short distance from the driver's hands.

Finally, the flow of air coming from the air dispensing means hits directly the chest or the face of the driver, thereby allowing the warm or cool air to reach quickly the driver. This increases comfort for the driver, who has the impression of being in a vehicle at an ideal temperature even a short time after entering the vehicle.

In an embodiment, the air dispensing means are located in the central part of the steering wheel.

In an embodiment, the central part of the steering wheel is uncoupled from the rim, so that the central part remains stationary while the rim is rotated.

This embodiment is particularly suitable for vehicles in which a hydraulic connection exists between the steering wheel and the vehicle's wheels. In this case, when the driver releases the steering wheel after turning to the left or to the right, the steering wheel never returns in a predetermined position around its rotation axis. By uncoupling the central part of the steering wheel from the rim, it is possible to ensure that the air dispensing means have the desired orientation whatever be the angular position of the steering wheel.

In an embodiment, the central part of the steering wheel is rigidly connected to the rim by at least one spoke.

This embodiment is particularly suitable for vehicles in which the steering wheel is mechanically connected to the vehicle's wheels. In this case, when the driver releases the steering wheel rim, the latter returns in a univocally determined position. Hence, there is no need to uncouple the steering wheel rim from the central part of the steering wheel in order to ensure that the air dispensing means are in a proper position.

SUMMARY OF THE INVENTION

A steering device for a vehicle, is provided, which comprises a steering wheel. The steering wheel includes a central part arranged for facing a driver and a rim that can be rotated in order to steer the vehicle, The steering wheel also has air dispensing means for directing an air flow towards the driver. The steering device also includes a conduit for conveying toward the steering wheel the air flow coming from an air distribution system of the vehicle. The central part of the steering wheel is uncoupled from the rim, so that the central part remains stationary as the rim is rotated. The conduit passes in a central hole of a gear, the gear being fixed relative to the rim for transmitting rotation from the rim to a steering shaft of the vehicle.

DETAILED DESCRIPTION OF THE DRAWINGS

The invention will be better understood and carried out with reference to the attached drawings, which show some exemplificative and non-limiting embodiments thereof, in which.

DETAILED DESCRIPTION OF THE EMBODIMENT(S)

Figure 1:
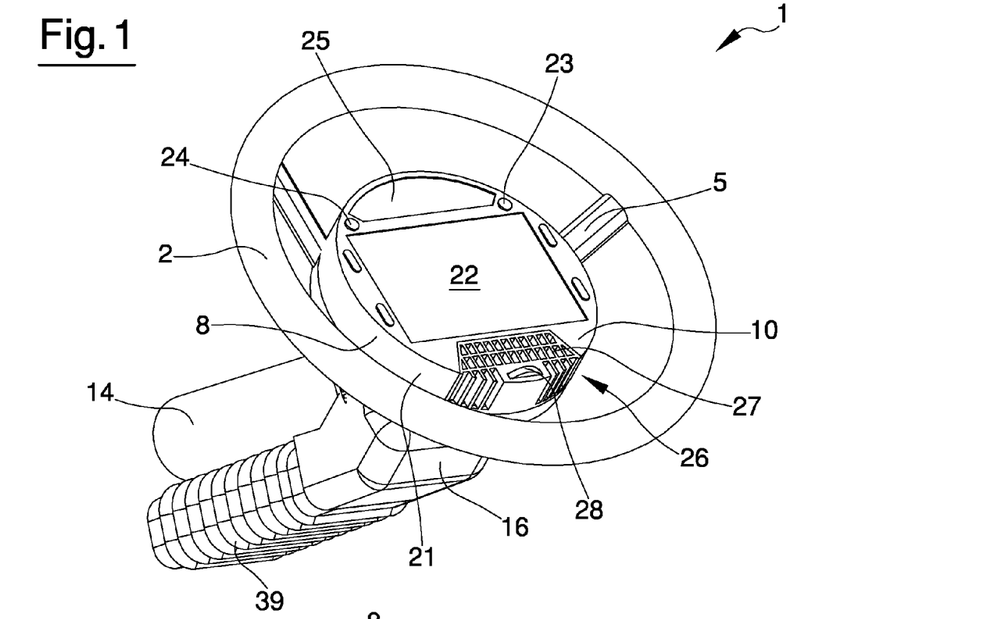
FIG. 1 is a schematic perspective view, showing a steering device for a vehicle.

FIG. 1 shows a steering device 1 for a vehicle, particularly a working vehicle such as a tractor, a combine or the like.

The steering device 1 comprises a steering wheel provided with a steering wheel rim 2, particularly having a circular shape. The steering wheel rim 2 can have a structure similar to known steering wheel rims, for example comprising a central core made of a metallic material such as steel. The central core can be covered with a layer of polymeric material, for example foamed polyurethane.

Figure 3:
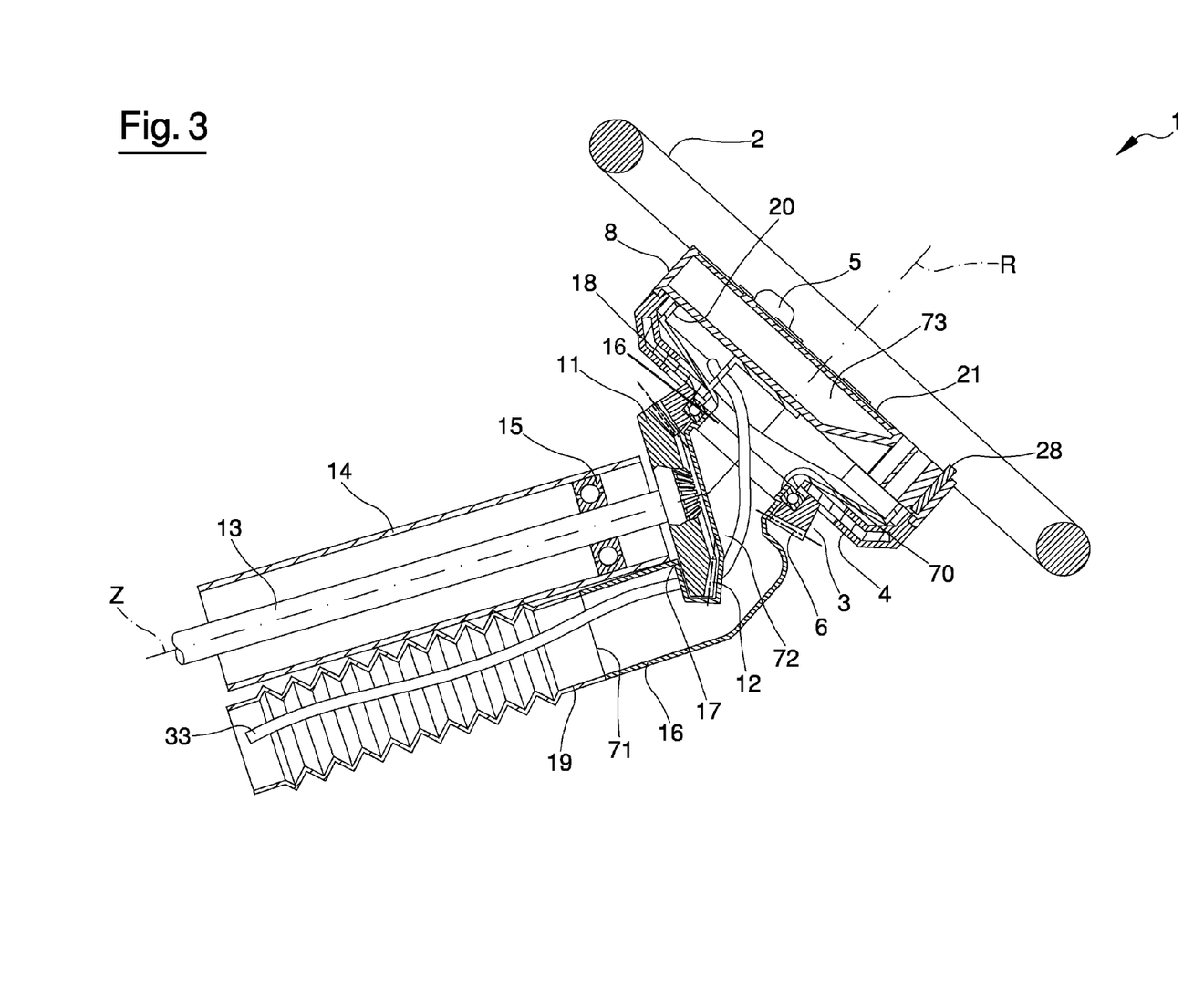
FIG. 3 is a cross-section taken along a central longitudinal plane of the steering device of FIG. 1.

The steering wheel rim 2 can be rotated by an operator around a rotation axis R, shown in FIG. 3, in order to turn the vehicle to the left or to the right. The rotation axis R is concentric with the steering wheel rim 2 and perpendicular to a plane defined by the steering wheel rim 2.

Figure 9:
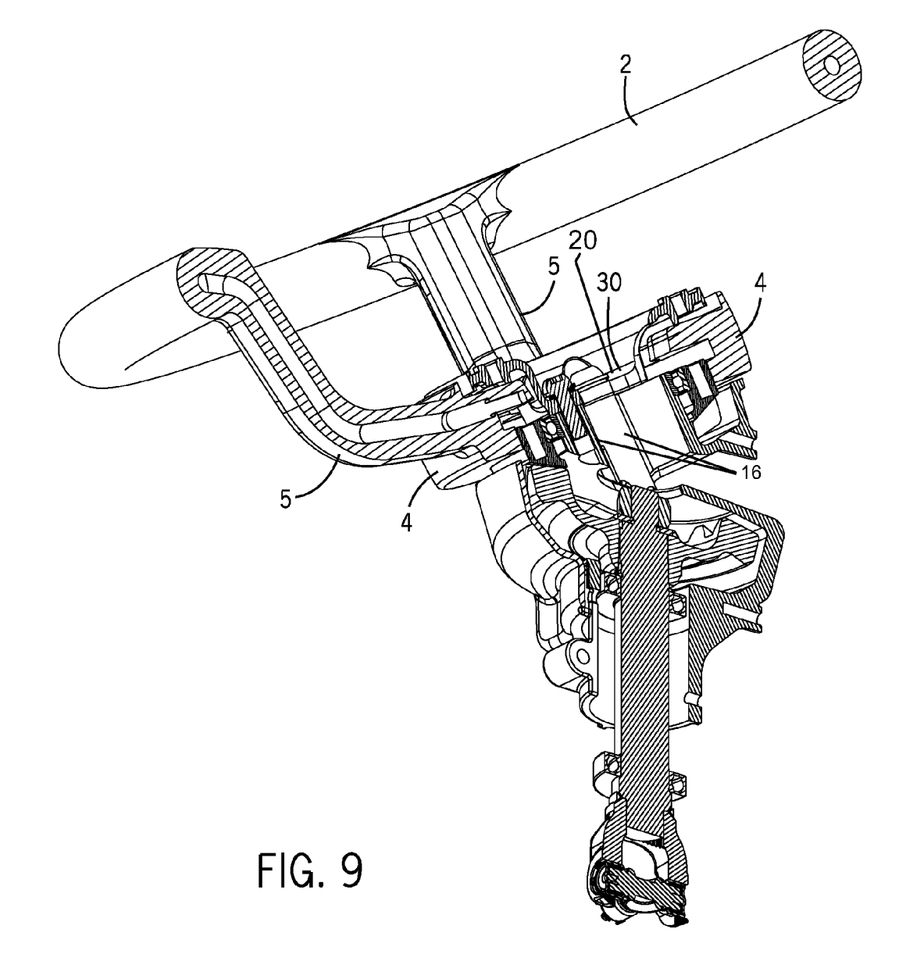
FIG. 9 is a cross-section similar to FIG. 3.

A first bevel gear 3 is fixed relative to the steering wheel rim 2. In particular, the first bevel gear 3 may be fastened, for example by means of screws that are not shown, to a body 4 arranged concentrically to the rotation axis R (FIG. 3). A plurality of spokes 5 are provided, each spoke 5 extending radially to connect the body 4 with the steering wheel rim 2, as shown in FIG. 9.

In the shown example, three spokes 5 are provided which are arranged at angles of 120° one from another. However, it is possible to use a number of spokes different from three.

The first bevel gear 3 has a plurality of teeth arranged on a frontal face 6 thereof.

Figure 5:
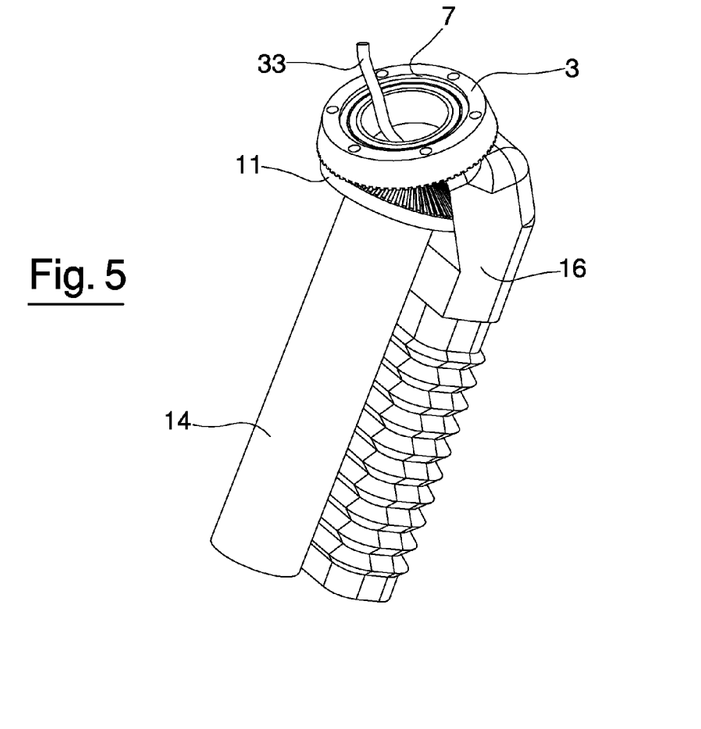
FIG. 5 is a perspective view of the steering device of FIG. 1, in which a steering wheel has been removed.

The first bevel gear 3 has a central hole 7, clearly shown in FIG. 5, whose function will be explained later.

Also the body 4 has a central opening which, in the assembled steering device 1, is positioned at the central hole 7 of the first bevel gear 3.

The steering device 1 further comprises a second bevel gear 11 for meshing directly with the first bevel gear 3. This means that no further bevel gears are interposed between the first bevel gear 3 and the second bevel gear 11, so that the teeth of the first bevel gear 3 engage directly with the teeth of the second bevel gear 11.

The bevel gears 3, 11 can be so dimensioned that the transmission ratio between the first bevel gear 3 and the second bevel gear 11 is 1:1. In this case, the number of teeth of the first bevel gear 3 is the same as the number of teeth of the second bevel gear 11. Also the pitch diameter of the first bevel gear 3 is equal to the pitch diameter of the second bevel gear 11.

The second bevel gear 11 has a structure which is similar to the structure of the first bevel gear 3. In particular, the second bevel gear 11 has a frontal surface 12 on which the teeth are provided, the frontal surface 12 facing the frontal face 6 of the first bevel gear 3.

The second bevel gear 11 also has a central hole.

The second bevel gear 11 can be mounted so as to be fixed relative to a steering shaft 13 of the vehicle, shown in FIG. 3. For example, the second bevel gear 11 can be keyed on the steering shaft 13, particularly at an end thereof.

The second bevel gear 11, together with the steering shaft 13, can be rotated around a longitudinal axis Z by the first bevel gear 3. The steering shaft 13 extends along the longitudinal axis Z.

The longitudinal axis Z is inclined, i.e. oblique, relative to the rotation axis R. In particular, as shown in FIG. 6, the longitudinal axis Z forms with the rotation axis R a right or an obtuse angle A, i.e. an angle which is greater than, or equal to, 90° and less than 180°.

Figure 6:
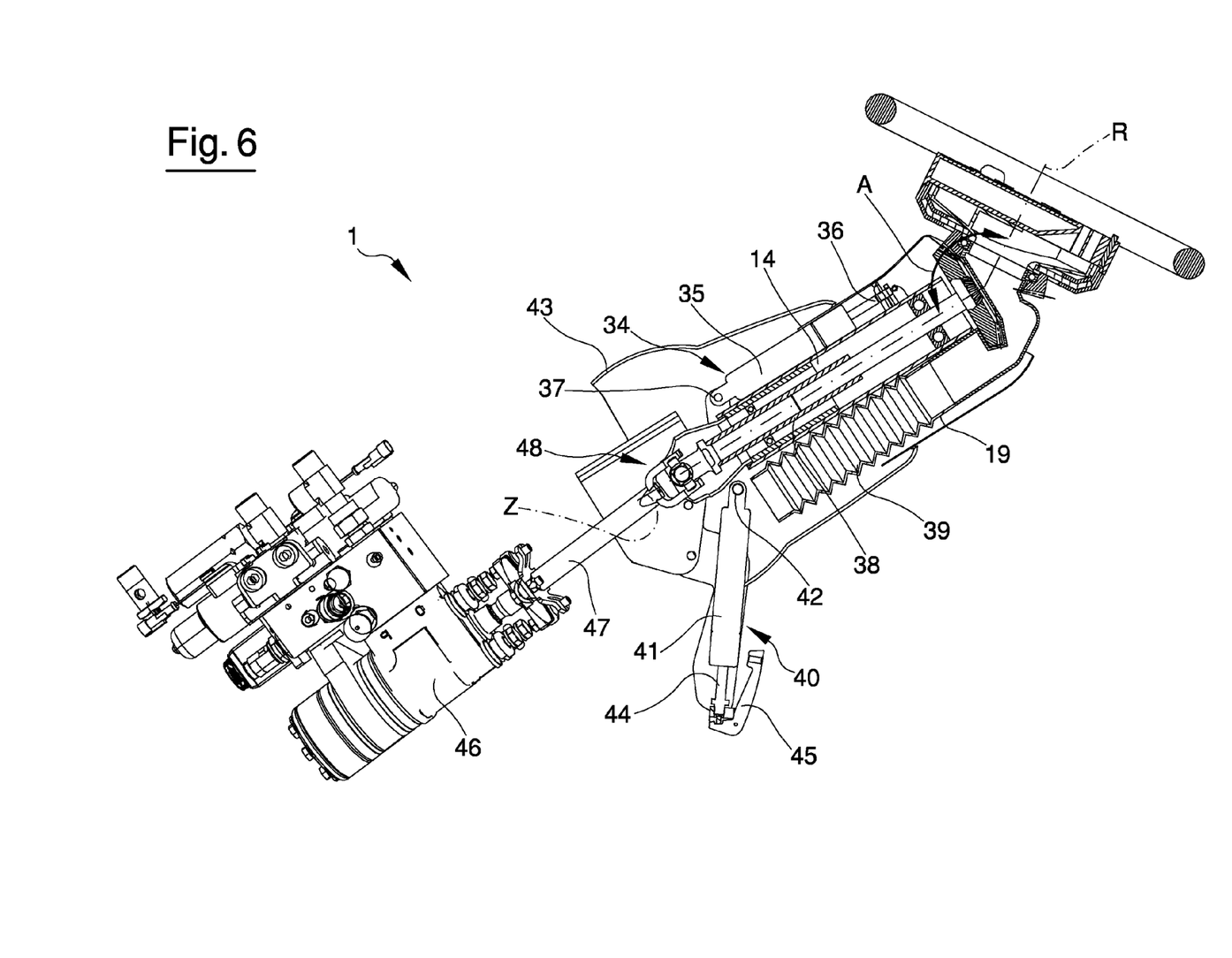
FIG. 6 is a cross-section, taken along a longitudinal plane, showing the steering device connected to a hydraulic pump of a vehicle.

The steering shaft 13 is included in a steering column which, as shown in FIG. 6, further comprises a steering sleeve 38 slidingly coupled to the steering shaft 13. An end of the steering shaft 13 opposite the first bevel gear 3 is inserted inside the steering sleeve 38 so that the steering shaft 13 can slide along the longitudinal axis Z relative to the steering sleeve 38, without however rotating relative to the steering sleeve 38.

The steering column is at least partially housed inside a sleeve 14. Bearings 15, for example of the ball type, can be interposed between the steering column and the sleeve 14, as shown in FIGS. 3 and 6. The steering shaft 13, together with the steering sleeve 38, can thus rotate relative to the sleeve 14.

A supporting element 16 is provided for rotatingly supporting the first bevel gear 3. The supporting element 16 can be connected to the sleeve 14.

The supporting element 16 is hollow and has a first end 70 and a second end 71. The first end 70 and the second end 71 are open, so that a passage is defined in the supporting element 16. The supporting element 16 can be made of metal, particularly aluminium, and can be obtained by pressure die-casting.

Figure 2:
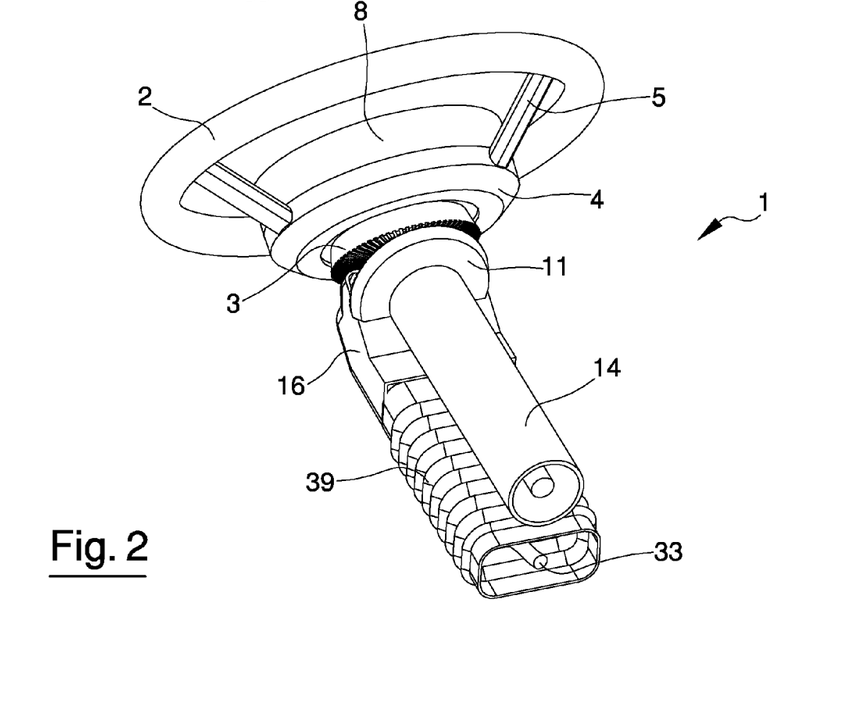
FIG. 2 is a schematic perspective view, showing the steering device of FIG. 1 from the bottom.

As shown in FIG. 2, the supporting element 16 partially encircles the second bevel gear 11.

Furthermore, as shown in FIG. 3, a portion 72 of the supporting element 16 occupies a space defined between the first bevel gear 3 and the second bevel gear 11.

At the first end 70 of the supporting element 16 a cylindrical edge is obtained, which is arranged coaxially with the first gear 3 at the central hole 7 thereof. For example, the cylindrical edge provided at the first end 70 can project inside the first gear 3. This cylindrical edge carries a supporting bearing 18 for rotatingly supporting the first bevel gear 3. In particular, an inner ring of the supporting bearing 18 is fixed relative to the supporting element 16 and an outer ring of the supporting bearing 18 is fixed relative to the first bevel gear 3.

Owing to the supporting bearing 18, the first bevel gear 3 can be rotated while the supporting element 16 remains stationary.

The second end 71 of the supporting element 16, opposite the first end 70, can be connected to a tubular element 19, shown in FIG. 3.

The steering device 1 further comprises a containing element 20 for containing electronic devices and other accessories associated to the steering wheel. The containing element 20 can be fastened to the supporting element 16, particularly at the first end 70 of the supporting element 16 which carries the supporting bearing 18.

The containing element 20 can be made of metal, particularly aluminium, or of plastics, particularly glass reinforced plastics.

The containing element 20 has a central opening which, in use, is aligned with the central hole 7 of the first bevel gear 3 and with the open first end 70 of the supporting element 16.

The steering device 1 further comprises a central part or panel 10 which, during use, faces the operator in the driving position. The central panel 10 is arranged at a location surrounded by the steering wheel rim 2, particularly concentrically with the steering wheel rim 2.

The central panel 10 can be defined on a covering element 21 associated to the containing element 20 in order to close the containing element 20. The covering element 21 may be removably fixed to the containing element 20, for example by fastening elements such as screws.

As shown in FIG. 3, the covering element 21 may have a side wall 8 projecting from the central panel 10 and suitable for contacting the containing element 20 so as to keep the central panel 10 at a distance from the containing element 20.

A plurality of control devices are located on the central panel 10. For example, the control devices might comprise a display 22 arranged in a central region of the central panel 10 for displaying information concerning the current status and working conditions of the vehicle. The display 22 may be a touch-screen display, in which case the operator is not only able to read information displayed on the control display 22, but can also input data or commands for the vehicle.

The control devices located on the central panel 10 may also comprise switches or push-buttons, for example a start-stop button 23 for starting or stopping an engine of the vehicle, or an emergency button 24.

The above mentioned control devices can also comprise one or more warning lights located in a region 25 of the central panel 10.

In addition, or as an alternative, to the control devices which have been described above, the central panel 10 can comprise dispensing means 26 for sending a flow of air towards the operator. The flow of air may be a flow of warm air, which has been heated by a heating device not shown. As an alternative, the flow of air may be a flow of fresh air, particularly cooled by a cooling device to be activated in hot seasons.

The dispensing means 26 can comprise a grid 27 arranged at a location on the central panel 10, particularly in a region of the central panel 10 which, in use, is proximal to the operator. A rotatable knob 28 may be associated to the grid 27 for changing orientation of the grid 27 to direct the flow of air in a desired direction. For example, during summer the operator may appreciate receiving a flow of fresh air in his face, whereas during winter the operator may choose to direct the flow of warm air towards his chest. The flow of air may also be directed towards the operator's fingers while the operator is holding the steering wheel rim 2.

Figure 4:
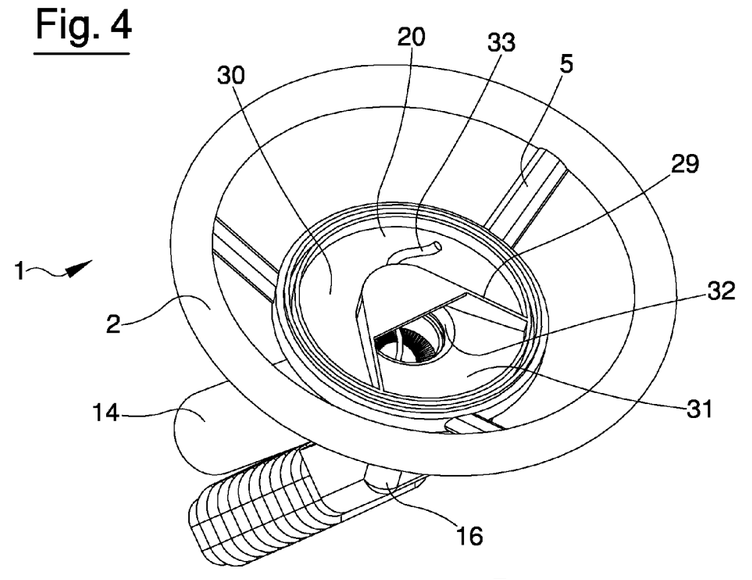
FIG. 4 is a perspective view of the steering device of FIG. 1, in which a central plate has been removed.

As shown in FIG. 4, in which the covering element 21 has been removed for the sake of clarity, inside the containing element 20 a partition wall 29 may be provided for defining in the containing element 20 a compartment 30 and a chamber 31.

The chamber 31 may be positioned, in use, below the grid 27 so as to distribute the flow of air coming from the heating device or the cooling device towards the operator. The chamber 31 is at least partially open at the top thereof.

A conduit 32 opens into the chamber 31 to put the chamber 31 in fluid communication with a distribution system which distributes warm or cooled air inside the vehicle. The conduit 32 is defined by the central opening of the containing element 20, by the passage defined internally of the supporting element 16 and by the tubular element 19.

The compartment 30 defined in the containing element 20 houses certain electric components that are necessary in order that the control devices provided in the central panel may work properly. In particular, the compartment 30 houses wires, circuits and supports associated with the control devices.

Further electric components associated to the above mentioned control devices may be housed in a recess 73 defined inside the covering element 21.

An electrical cable 33 terminates in the compartment 30 so as to connect the control devices located on the central panel 10 with an electrical power source, for example a battery of the vehicle.

The cable 33 passes through the tubular element 19, the supporting element 16 and the central opening made in the containing element 20. The cable 33 arrives in the compartment 30 through a hole obtained in the partition wall 29.

The supporting element 16, as illustrated in FIGS. 3 and 9, has therefore a plurality of functions, namely:
rotatingly supporting the first bevel gear 3 by means of the supporting bearing 18;
positioning the first bevel gear 3 relative to the second bevel gear 11 or to the steering shaft 13;
supporting the containing element 20, so that the containing element 20 remains stationary as the steering wheel rim 2 rotates;
providing a passage for the flow of air directed towards the dispensing means 26, so as to convey the flow of air along a predetermined path;
providing a passage for the electrical cable 33, so as to avoid interference between the electrical cable 33 and the bevel gears 3, 11.

An axial adjusting device 34 can be provided for adjusting the position of the steering wheel along the longitudinal axis Z, according to the operator's needs. The axial adjusting device 34 can comprise a gas spring 35 for example of the kind having a lock position. The gas spring 35 has a first end 36 connected to the sleeve 14. A second end 37 of the gas spring 35, opposite the first end 36, is connected to a frame of the vehicle.

The gas spring 35 can be lengthened or shortened by displacing the first end 36 parallel to the longitudinal axis Z. When this occurs, the sleeve 14, as well as the steering shaft 13 supported by the sleeve 14, are displaced together with the first end 36 along the longitudinal axis Z. The bevel gears 3, 11, the steering wheel and the components associated thereto are consequently moved far away from, or close to, the operator, until the desired position has been reached.

While adjusting the axial position of the steering shaft 13, the latter can slide relative to the steering sleeve 38.

As the axial position of the steering shaft 13 varies, the length of the tubular element 19 is also modified. A compensation element is associated to the tubular element 19 allowing the length of the tubular element 19 to be modified, in order to compensate for variations in the axial position of the steering shaft 13. As shown in FIG. 1, the compensation element may comprise a bellows 39 obtained in a side wall of the tubular element 19.

As shown in FIG. 6, a tilt adjusting device 40 can be provided for adjusting tilting of the steering column, so that the steering wheel can be positioned at a selected angle relative to the ground, or more precisely relative to the floor of the vehicle. This angle is chosen so that the operator sits comfortably on the vehicle during driving.

The tilt adjusting device 40 may comprise a tilt adjusting gas spring 41, for example having a lock position. The tilt adjusting gas spring 41 may have an end 42 connected to a support 43 which supports the steering column. A further end 44 of the tilt adjusting gas spring 41 may be connected to the frame of the vehicle.

By acting on the tilt adjusting device 40, the tilt adjusting gas spring 41 may be lengthened or shortened and the end 42 can be moved away from, or close to, the further end 44. Tilt of the steering column, and particularly of the steering shaft 13, can thus be modified according to the operator's wishes.

The operator may act on the tilt adjusting device 40 by acting on a pedal 45 shown in FIG. 6. The pedal 45 may be connected to the tilt adjusting gas spring 41. By acting on the pedal 45, the operator can thus change the angle between the steering shaft 13 and the ground.

In an embodiment, the pedal 45 may also allow the operator to modify axial position of the steering shaft 13. In this case, the pedal 45 is connected to the gas spring 35 of the axial adjusting device 34. By acting on the pedal 45, the operator can thus control both inclination and axial position of the steering shaft 13.

In another embodiment, the axial adjusting device 34 may be controlled by a control element different from the pedal 45, for example by another pedal or a lever.

As shown in FIG. 6, the steering device 1 can be included in a hydraulic power steering system in which a hydraulic fluid is used to steer the vehicle's wheels. In this case, a pump 46 is provided for sending the hydraulic fluid towards the vehicle's wheels. By applying a torque on the steering wheel, the operator operates a plurality of valves to control flow of the hydraulic fluid.

The steering shaft 13 and the steering sleeve 38 may be configured to operate on the pump 46 through an interposed shaft 47 connected to the steering sleeve 38 by a universal joint 48.

During use, the operator acts on the steering wheel by rotating the steering wheel rim 2 clockwise or counter-clockwise around the rotation axis R. The body 4, which is connected to the steering wheel rim 2 by the spokes 5, is consequently rotated. The first bevel gear 3, which is fixed to the body 4, is also rotated around the rotation axis R. The first bevel gear 3 is supported during rotation by the supporting bearing 18, provided on the supporting element 16. The latter remains still.

The first bevel gear 3 engages the second bevel gear 11 thereby rotating the second bevel gear 11 around the longitudinal axis Z. The second bevel gear 11 in turn rotates the steering shaft 13 and more in general the steering column, which causes the vehicle's wheels to steer to the desired direction.

The steering column is supported during rotation by the bearings 15, mounted inside the sleeve 14 which remains still.

When the operator rotates the steering wheel rim 2, the central panel 10 remains still. This occurs because the central panel 10 is mounted on the containing element 20, which in turn is supported by the supporting element 16. As already explained, the latter is not rotated by acting on the steering wheel rim 2.

The operator can easily see the control devices located on the central panel 10, and act on them, in any position of the steering wheel rim 2, since the position of these control devices is not affected by rotation of the steering wheel rim 2. In particular, the operator can easily input data and instructions to the control display 22, if the latter is a touch-screen display. If the control display 22 were located on the dashboard, interacting with the control display would be much more complicated for the operator.

Since the central panel 10 is easily reachable and visible, comfort for the operator is increased, because the operator does not have to move the upper part of his or her body in order to see or act on the control devices. If on the other hand the control devices were located behind the steering wheel on the dashboard, as frequently occurs in known vehicles, the operator would have to tilt his or her body forward in order to see or reach these control devices.

Furthermore, it is possible to reduce the risk that the operator may temporarily lose control of the vehicle while trying to reach control devices located on the dashboard far away from his or her body.

The operator can also act on a heating system or conditioning system of the vehicle and have warm air or cool air distributed by the dispensing means 26. Since the latter are associated to the central panel 10, rotation of the steering wheel rim 2 does not influence quantity or direction of the dispensed air.

In an embodiment which is not shown, only control devices could be provided on the central panel 10. In other words, the dispensing means 26 could be missing.

In another embodiment, only the dispensing means 26 could be provided on the central panel 10, whereas the control display 22, the buttons 23, 24 and the warning lights are missing.

Figure 7:
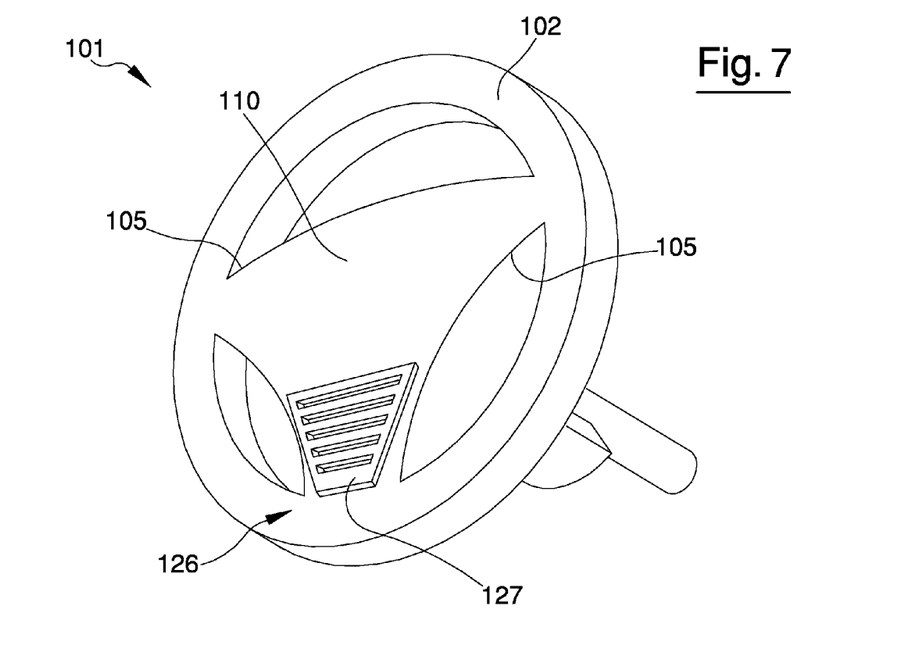
FIG. 7 is a schematic perspective view, showing a steering device according to an alternative embodiment.
Figure 8:
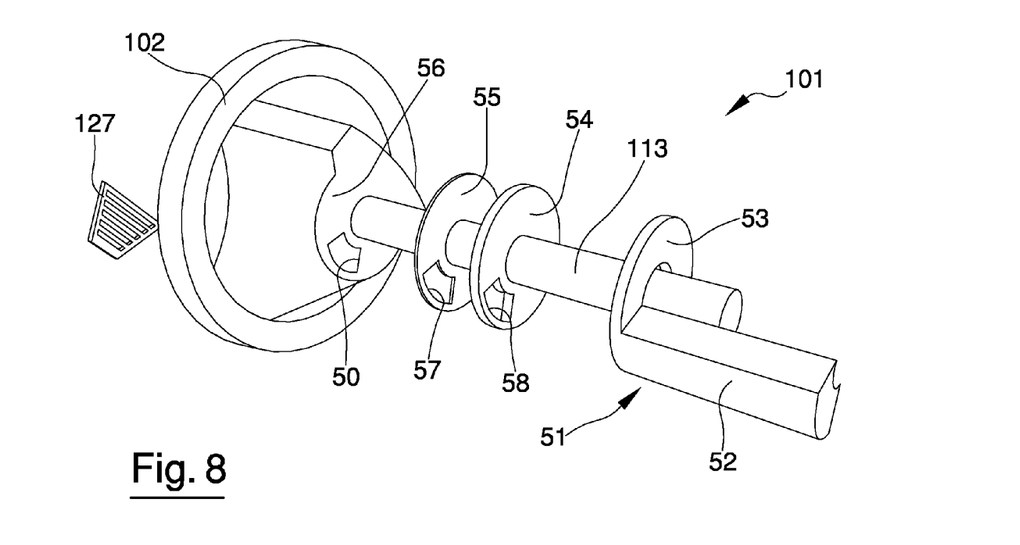
FIG. 8 is an exploded perspective view of the steering device of FIG. 7.

FIGS. 7 and 8 show a steering device 101 according to an alternative embodiment. The steering device 101 is particularly suitable for vehicles such as cars, trucks, buses or the like, in which there is a mechanical connection between the steering wheel and the vehicle's wheels. In this case, the position of the steering wheel when the vehicle is travelling in a straightforward direction is univocally determined. Hence, there is no need to uncouple the steering wheel rim from the central part of the steering wheel.

The steering device 101 comprises a steering wheel rim 102 connected to a central part 110 of the steering wheel by spokes 105. The central part 110 is fixed relative to the steering wheel rim 102.

On the central part 110, dispensing means 126 are provided for dispensing a flow of air towards the driver. The flow of air can be either warm or cool according to the driver's preferences, i.e. depending on whether the driver has turned on a heating device or a cooling device of the vehicle.

The dispensing means 126 may comprise a grid 127 arranged at a desired location on the central part 110, for example in a lower region of the central part 110 close to the steering wheel rim 102.

As shown in FIG. 8, the dispensing means 126 further comprise a passage 50 obtained through the thickness of the central part 110 for bringing the flow of air towards the grid 127. The passage 50 extends from the grid 127 to a back surface 56 of the central part 110.

A distributor element 51 is further provided for delivering air to the dispensing means 126. The distributor element 51 may comprise a conduit 52 which is fixed relative to a frame of the vehicle and is in fluid communication with the air distribution system of the vehicle.

The distributor element 51 may comprise a flange 53, for example having a circular shape. A hole is provided in a central region of the flange 53.

The steering device 101 further comprises a steering shaft 113 connected to the steering wheel, so that the steering shaft 113 is rotated by rotating the steering wheel. The steering shaft 113 passes through the hole of the flange 53 and can rotate relative to the flange 53.

An elastic element 54 can be interposed between the flange 53 and an anti-friction disc 55. The anti-friction disc 55 is made of a material having a low coefficient of friction and is intended to be contacted by the back surface 56 of the steering wheel. When the steering wheel is rotated, the back surface 56 slides in contact with the anti-friction disc 55. This reduces friction that must be overcome to rotate the steering wheel.

Both the anti-friction disc 55 and the elastic element 54 have a central hole through which the steering shaft 113 passes. A through opening 57 is made in the anti-friction disc 55 and a further through opening 58 is made in the elastic element 54. The through opening 57 and the further through opening 58 have a shape which approximately corresponds to the shape of the cross section of the conduit 52.

In the assembled steering device 101, the through opening 57 and the further through opening 58 are aligned with the conduit 52. The through openings 57, 58 are also aligned with the passage 50, when the steering wheel is in its rest position corresponding to the vehicle advancing along a straight direction.

The flow rate of the air sent towards the driver's body is maximum when the vehicle is advancing along a straight direction, in which case substantially the whole cross section of the passage 50 faces the through opening 57. When the steering wheel is rotated, communication between the passage 50 and the conduit 52 is reduced or even temporarily interrupted. However, as soon as the steering wheel is returned to its rest position, a full flow of air towards the operator's body is re-obtained. Comfort for the operator can therefore be kept at good levels.

The invention claimed is:

1. A steering device for a vehicle, comprising:
    a steering wheel including
        a central part arranged for facing a driver and a rim that can be rotated in order to steer the vehicle; and
        air dispensing means for directing an air flow towards the driver;
    a conduit for conveying toward the steering wheel the air flow coming from an air distribution system of the vehicle,
    wherein the central part of the steering wheel is uncoupled from the rim, so that the central part remains stationary as the rim is rotated,
    wherein the conduit passes in a central hole of a gear, the gear being fixed relative to the rim for transmitting rotation from the rim to a steering shaft of the vehicle, and
    wherein the air dispensing means are located on the central part of the steering wheel.

2. The steering device according to claim 1, wherein the air dispensing means comprise a grid, an adjusting element being preferably provided for adjusting orientation of the grid.

3. The steering device according to claim 1, further comprising a containing body uncoupled from the rim and a covering element closing the containing body, the central part being defined on the covering element.

4. The steering device according to claim 3, wherein the conduit opens in a chamber defined in the containing body.

5. The steering device of claim 1, further comprising at least one control device located in the central part for controlling the vehicle during operation.

6. The steering device according to claim 5, wherein the containing body comprises a partition wall for dividing the chamber from a compartment which houses at least partially the control device.

7. The steering device according to claim 6, wherein an electric cable passes through the conduit, the electric cable being connected to the control device.

8. The steering device according to claim 1, wherein the air dispensing means further comprise a passage obtained in the central part of the steering wheel, the passage being in fluid communication with the conduit through a cross section having an area which varies as the rim is rotated relative to the conduit.

9. The steering device according to claim 1, further comprising an axial adjusting device for adjusting distance between the steering wheel and the driver and/or a tilt adjusting device for adjusting tilting of the steering wheel relative to a floor of the vehicle.

10. The steering device according to claim 9, wherein the axial adjusting device comprises a length compensation element including a bellows, the length compensation element being provided along the conduit for allowing length of the conduit to be varied.

* * * * *